US010222809B2

(12) United States Patent
Dong et al.

(10) Patent No.: US 10,222,809 B2
(45) Date of Patent: Mar. 5, 2019

(54) INFORMATION PROCESSING METHOD, MOBILE DEVICE AND COMPUTER STORAGE MEDIUM

(71) Applicant: NINEBOT (BEIJING) TECH CO., LTD., Beijing (CN)

(72) Inventors: Shiqian Dong, Beijing (CN); Guanjiao Ren, Beijing (CN); Ye Wang, Beijing (CN); Li Pu, Beijing (CN)

(73) Assignee: NINEBOT (BEIJING) TECH CO., LTD., Beijing (CN)

( * ) Notice: Subject to any disclaimer, the term of this patent is extended or adjusted under 35 U.S.C. 154(b) by 139 days.

(21) Appl. No.: 15/505,238

(22) PCT Filed: Sep. 30, 2016

(86) PCT No.: PCT/CN2016/101363
§ 371 (c)(1),
(2) Date: Feb. 20, 2017

(87) PCT Pub. No.: WO2017/166767
PCT Pub. Date: Oct. 5, 2017

(65) Prior Publication Data

US 2018/0164836 A1 Jun. 14, 2018

(30) Foreign Application Priority Data

Mar. 31, 2016 (CN) .......................... 2016 1 0202012

(51) Int. Cl.
*G05D 1/12* (2006.01)
*G05D 1/00* (2006.01)
*G05D 1/02* (2006.01)

(52) U.S. Cl.
CPC ............. *G05D 1/12* (2013.01); *G05D 1/0088* (2013.01); *G05D 1/0202* (2013.01); *G05D 1/0231* (2013.01); *G05D 1/0257* (2013.01)

(58) Field of Classification Search
CPC ...... G05D 1/12; G05D 1/0257; G05D 1/0088; G05D 1/0202; G05D 1/0231
See application file for complete search history.

(56) References Cited

U.S. PATENT DOCUMENTS 4,814,994 A * 3/1989 Doane .................... G01C 21/00 342/29
6,691,018 B1 * 2/2004 Miyahara ........... B60K 31/0008 340/435

(Continued)

FOREIGN PATENT DOCUMENTS

WO 2012112908 A2 8/2012

*Primary Examiner* — Mary Cheung
(74) *Attorney, Agent, or Firm* — Platinum Intellectual Property LLP

(57) ABSTRACT

The present invention discloses an information processing method applied to a mobile device, including: acquiring a first vector, wherein the first vector is used for describing the change of a relative velocity between the mobile device and a followed target object caused by the own movement of a first coordinate system which is fixedly connected with the mobile device; acquiring a second vector, wherein the second vector is a relative velocity vector between the mobile device and the followed target object; adding the first vector to the second vector to acquire a third vector, wherein the third vector is an absolute velocity vector of the target object; and acquiring a first included angle according to the third vector, wherein the first included angle is an included angle between the own absolute velocity vector of the mobile device and the third vector; and generating a control law for controlling the movement of the mobile device according to the first included angle. The invention further discloses a mobile device and a computer storage medium.

13 Claims, 3 Drawing Sheets

(56) References Cited

U.S. PATENT DOCUMENTS

| | | | | |
|---|---|---|---|---|
| 6,944,542 | B1 * | 9/2005 | Eschenbach ......... | G01C 21/165 701/472 |
| 2007/0295089 | A1 | 12/2007 | Velinsky et al. | |
| 2009/0157314 | A1 * | 6/2009 | Jordan .................. | B60W 40/04 701/300 |
| 2010/0017180 | A1 * | 1/2010 | Randler ................ | B60W 40/04 703/8 |
| 2012/0310405 | A1 | 12/2012 | Aizawa et al. | |
| 2014/0114569 | A1 | 4/2014 | Qi | |
| 2016/0116589 | A1 * | 4/2016 | Fukuman .............. | G01S 15/878 367/89 |

* cited by examiner

INFORMATION PROCESSING METHOD, MOBILE DEVICE AND COMPUTER STORAGE MEDIUM

RELATED APPLICATIONS

This application is a United States National Stage Application filed under 35 U.S.C 371 of PCT Patent Application Serial No. PCT/CN2016/101363, filed Sep. 30, 2016, which claims Chinese Patent Application Serial No. CN 201610202012.1, filed Mar. 31, 2016, the disclosure of all of which are hereby incorporated by reference in their entirety.

FIELD OF THE INVENTION

The present invention relates to the field of target following technology, and in particular, to an information processing method, a mobile device and a computer storage medium.

BACKGROUND OF THE INVENTION

An autonomous mobile device refers to a device which can achieve autonomous movement based on information obtained by itself without external control, such as autonomous movement control (e.g., obstacle avoidance) based on detection of an external environment, or autonomous movement control based on target following, and so on. The autonomous mobile devices can beat least divided into two-dimensional autonomous mobile devices (e.g., ground autonomous mobile devices), three-dimensional autonomous mobile devices (e.g., unmanned aerial vehicles) and the like in terms of mobile dimension. Target following is a common skill necessary for the autonomous mobile device, and how to realize omnidirectional target following of the autonomous mobile device is a technical problem to be solved by the present invention.

SUMMARY OF THE INVENTION

To solve the technical problems in the prior art, embodiments of the present invention provide an information processing method, a mobile device and a computer storage medium.

The embodiments of the present invention are achieved as follows:

In one embodiment of the present invention, an information processing method applied to a mobile device is provided, including:

acquiring a first vector, wherein the first vector is used for describing the change of a relative velocity between the mobile device and a followed target object caused by the own movement of a first coordinate system which is fixedly connected with the mobile device;

acquiring a second vector, wherein the second vector is a relative velocity vector between the mobile device and the followed target object;

adding the first vector to the second vector to acquire a third vector, wherein the third vector is an absolute velocity vector of the target object; and acquiring a first included angle according to the third vector, wherein the first included angle is an included angle between the own absolute velocity vector of the mobile device and the third vector; and generating a control law for controlling the movement of the mobile device according to the first included angle.

In one embodiment, the generating a control law for controlling the movement of the mobile device according to the first included angle includes:

decomposing a target relative position into a first relative position and a second relative position according to the first included angle, generating a corresponding first control law according to the first relative position, and generating a corresponding second control law according to the second relative position and the first included angle, wherein the target relative position is a following position where the mobile device is about to arrive at and which is acquired by the mobile device according to the movement of the target object;

wherein, the first control law is used for controlling a translation velocity of the mobile device, and the first control law drives the first relative position to gradually converge; and the second control law is used for controlling a rotating velocity of the mobile device, and the second control law drives the second relative position and the first included angle to gradually converge.

In one embodiment, the decomposing a target relative position into a first relative position and a second relative position according to the first included angle includes:

in a second coordinate system constructed with the followed target object as a coordinate origin, setting a positive X axis direction of the second coordinate system to be overlapped with the motion direction of the target object; in the second coordinate system, the coordinates of the target relative position are $x_0$, $y_0$; and the first relative position and the second relative position are represented as follows:

$$\Delta \chi = \chi_0 - \rho \cos(\alpha - \theta_\gamma)$$

$$\Delta y = y_0 - \rho \sin(\alpha - \theta_\gamma)$$

wherein, first relative position information of the target object relative to the mobile device is represented as a second included angle $\alpha$ and a first radius vector scalar $\rho$ by polar coordinates, $\Delta_x$ represents the first relative position, $\Delta_y$ represents the second relative position, and $\theta_\gamma$ represents the first included angle.

In one embodiment, the generating a corresponding second control law according to the second relative position includes:

acquiring a first approach angle $\theta_\alpha = \Delta y * k$ according to the second relative position, wherein $\theta_\alpha$ represents the first approach angle, and k represents a proportionality coefficient; and acquiring the second control law according to the first approach angle $\theta_\alpha$ and the first included angle $\theta_\gamma$.

In one embodiment, the acquiring a first vector includes:

acquiring the first relative position information of the target object relative to the mobile device, wherein the first relative position information is represented as the second included angle $\alpha$ and the first radius vector $\rho$ by the polar coordinates, the first radius vector scalar $\rho$ represents the radius vector scalar from the mobile device to the target object, and the second included angle $\alpha$ represents the included angle between the first radius vector scalar $\rho$ and an absolute translation velocity vector $v_f$ of the mobile device; and acquiring the first vector through the following relationship: $F = -(\omega_f * \rho + v_f)$, wherein F represents the first vector, $\omega_f$ represents an absolute rotating velocity vector of the mobile device, and $v_f$ represents the absolute translation velocity vector of the mobile device.

In one embodiment, the acquiring a second vector includes:

acquiring the first relative position information of the target object relative to the mobile device, wherein the first relative position information is represented as the second included angle $\alpha$ and the first radius vector scalar $\rho$ by the polar coordinates, the first radius vector scalar $\rho$ represents the radius vector scalar from the mobile device to the target object, and the second included angle $\alpha$ represents the included angle between the first radius vector scalar $\rho$ and the absolute translation velocity vector $v_f$ of the mobile device; and carrying out a differential operation according to the first relative position information to acquire the second vector, wherein the second vector is represented as follows in a coordinate manner:

$$R=\left(\frac{d[\rho(t)\cos\alpha(t)]}{dt},\frac{d[\rho(t)\sin\alpha(t)]}{dt}\right)$$

wherein, R represents the second vector, and $\rho$ represents the first radius vector scalar.

In another embodiment of the present invention, a mobile device is further provided, including:

a first vector acquisition unit, configured to acquire a first vector, wherein the first vector is used for describing the change of a relative velocity between the mobile device and a followed target object caused the own movement of a first coordinate system which is fixedly connected with the mobile device;

a second vector acquisition unit, configured to acquire a second vector, wherein the second vector is a relative velocity vector between the mobile device and the followed target object;

a third vector acquisition unit, configured to add the first vector to the second vector to acquire a third vector, wherein the third vector is an absolute velocity vector of the target object;

a first included angle acquisition unit, configured to acquire a first included angle according to the third vector, wherein the first included angle is an included angle between the own absolute velocity vector of the mobile device and the third vector; and a control law generation unit, configured to generate a control law for controlling the movement of the mobile device according to the first included angle.

In another embodiment, the control law generation unit is further configured to decompose a target relative position into a first relative position and a second relative position according to the first included angle, generate a corresponding first control law according to the first relative position, and generate a corresponding second control law according to the second relative position and the first included angle, wherein the target relative position is a following position where the mobile device is about to arrive at and which is acquired by the mobile device according to the movement of the target object;

wherein, the first control law is used for controlling the translation velocity of the mobile device, and the first control law drives the first relative position to gradually converge; and the second control law is used for controlling the rotating velocity of the mobile device, and the second control law drives the second relative position and the first included angle to gradually converge.

In another embodiment, the control law generation unit is further configured to: in a second coordinate system constructed with the followed target object as a coordinate origin, set a positive X axis direction of the second coordinate system to be overlapped with the motion direction of the target object; in the second coordinate system, the coordinates of the target relative position are $x_0$, $y_0$; and the first relative position and the second relative position are represented as follows:

$$\Delta\chi=\chi_0-\rho\cos(\alpha-\theta_\gamma)$$

$$\Delta y=y_0-\rho\sin(\alpha-\theta_\gamma)$$

wherein, first relative position information of the target object relative to the mobile device is represented as a second included angle $\alpha$ and a first radius vector scalar $\rho$ by polar coordinates, $\Delta x$ represents the first relative position, $\Delta y$ represents the second relative position, and $\theta_\gamma$ represents the first included angle.

In another embodiment, the control law generation unit is further configured to: acquire a first approach angle $\theta_\alpha=\Delta y*k$ according to the second relative position, wherein $\theta_\alpha$ represents the first approach angle, and k represents a proportionality coefficient; and acquire the second control law according to the first approach angle $\theta_\alpha$ and the first included angle $\theta_\gamma$.

In another embodiment, the first vector acquisition unit is further configured to:

acquire the first relative position information of the target object relative to the mobile device, wherein the first relative position information is represented as the second included angle $\alpha$ and the first radius vector $\rho$ by the polar coordinates, the first radius vector scalar $\rho$ represents the radius vector scalar from the mobile device to the target object, and the second included angle $\alpha$ represents the included angle between the first radius vector scalar $\rho$ and an absolute translation velocity vector $v_f$ of the mobile device; and acquire the first vector through the following relationship: $F=-(\omega_f*\rho+v_f)$, wherein F represents the first vector, $\omega_f$ represents an absolute rotating velocity vector of the mobile device, and $v_f$ represents the absolute translation velocity vector of the mobile device.

In another embodiment, the second vector acquisition unit is further configured to:

acquire the first relative position information of the target object relative to the mobile device, wherein the first relative position information is represented as the second included angle $\alpha$ and the first radius vector scalar $\rho$ by the polar coordinates, the first radius vector scalar $\rho$ represents the radius vector scalar from the mobile device to the target object, and the second included angle $\alpha$ represents the included angle between the first radius vector scalar $\rho$ and the absolute translation velocity vector $v_f$ of the mobile device; and carry out a differential operation according to the first relative position information to acquire the second vector, wherein the second vector is represented as follows in a coordinate manner:

$$R=\left(\frac{d[\rho(t)\cos\alpha(t)]}{dt},\frac{d[\rho(t)\sin\alpha(t)]}{dt}\right)$$

wherein, R represents the second vector, and $\rho$ represents the first radius vector scalar.

In another embodiment of the present invention, a computer storage medium is further provided, wherein a computer executable instruction is stored in the computer storage medium, and the computer executable instruction is configured to execute the information processing method in the embodiment of the present invention.

By adopting the information processing method, the mobile device and the computer storage medium provided by the embodiments of the present invention, the mobile device can follow any specified position of the target object (i.e., achieve omnidirectional following), and the mobile device can not only follow behind the target object, but also can follow in front of the target object. Moreover, in the embodiments of the present invention, the absolute position between the mobile device and the followed object does not need to be acquired in the target following, and only the relative position between the mobile device and the followed object needs to be acquired. Therefore, in the target following in the embodiments of the present invention, only a relative position sensor mounted on the mobile device is used for acquiring the position of the followed object relative to the autonomous mobile device; and no absolute position sensor (e.g., GPS) needs to participate, therefore the inconvenience of outdoor satellite-search positioning of the GPS or the like is avoided.

BRIEF DESCRIPTION OF THE DRAWINGS

By reading the detailed description in the preferred embodiments below, various other advantages and benefits will become clear to those of ordinary skill in the art. The accompanying drawings in the embodiments are merely for the purpose of showing the preferred embodiments, but cannot be deemed as limitations to the present invention. In the accompanying drawings.

DETAILED DESCRIPTION OF THE EMBODIMENTS

Exemplary embodiments of the present disclosure will be described below in more detail with reference to the accompanying drawings. Although the exemplary embodiments of the present disclosure are displayed in the accompanying drawings, it should be understood that the present disclosure can be implemented in a variety of forms and should not be limited by the embodiments set forth herein. On the contrary, these embodiments are provided so as to provide a more thorough understanding of the present disclosure, and the scope of the present disclosure can be completely conveyed to those skilled in the art.

Technical solutions of the present invention will be further illustrated below in detail in combination with the accompanying drawings and specific embodiments.

Embodiment 1

Figure 1:
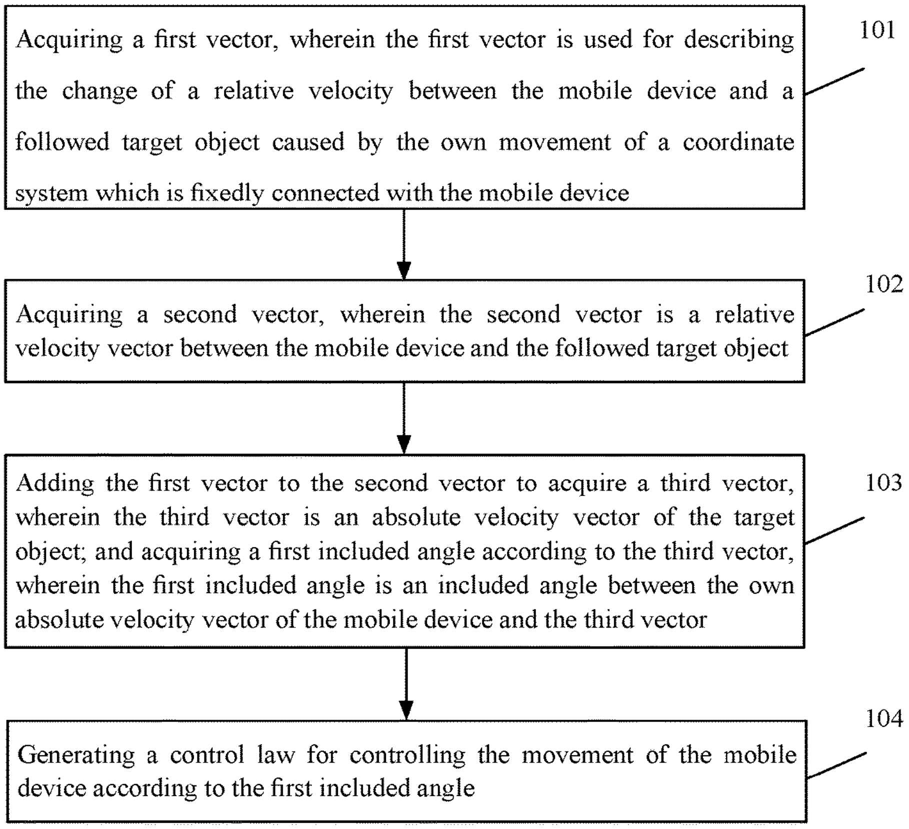
FIG. 1 is a flowchart of an information processing method in the first embodiment of the present invention.

Embodiment 1 of the present invention provides an information processing method, which is applied to a mobile device. The mobile device refers to a device which can achieve autonomous movement, the so-called autonomous movement refers to movement which can be autonomously achieved according to autonomously acquired information without external control, for example: autonomous movement control (e.g., obstacle avoidance, path planning) based on the detection of an external environment, or autonomous movement control based on target following, and so on. For example, common mobile devices include self-balancing cars, unmanned aerial vehicles and the like. As shown in FIG. 1, the method mainly includes:

step 101, a first vector is acquired, wherein the first vector is used for describing the change of a relative velocity between the mobile device and a followed target object caused by the own movement of a first coordinate system which is fixedly connected with the mobile device.

In the embodiment of the present invention, the vector (Vector) refers to mathematical quantity which has a size and a direction, and can be used for representing velocity, position, force and the like, and the addition and subtraction thereof abide by the law of parallelogram.

Figure 2:
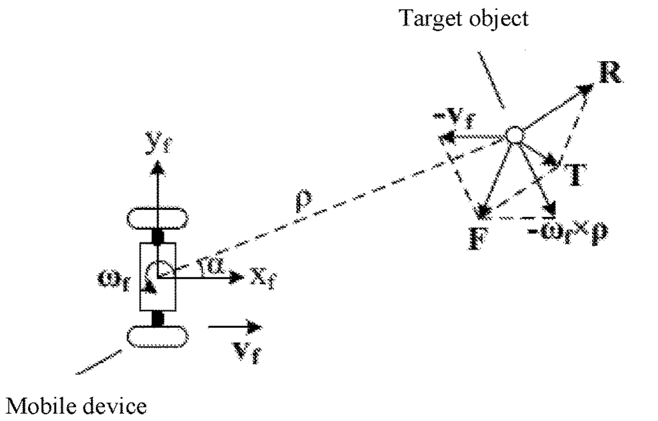
FIG. 2 is a schematic diagram of mathematical modeling in one embodiment of the present invention.

As shown in FIG. 2, FIG. 2 is a schematic diagram of mathematical modeling in the embodiment of the present invention. The first coordinate system (i.e., a coordinate system with a horizontal axis $x_f$ and a vertical axis $y_f$ in FIG. 2) which is fixedly connected with the mobile device is constructed, and in the first coordinate system which is fixedly connected with the mobile device, a motion relationship between the mobile device and the following target object thereof is as shown in FIG. 2. A relative position sensor is arranged on the mobile device, first relative position information of the followed target object relative to the mobile device measured at a certain moment is represented as an included angle $\alpha$ and a first radius vector scalar $\rho$ by polar coordinates, wherein the first radius vector scalar $\rho$ represents the radius vector scalar from the mobile device to the target object, and the included angle $\alpha$ represents the included angle between the first radius vector scalar $\rho$ and an absolute translation velocity vector $v_f$ of the mobile device. In addition, the translation velocity vector of the mobile device relative to the ground is $v_f$, and the rotating velocity vector relative to the ground is $\omega_f$, the $v_f$ and the $\omega_f$ can be measured by a coded disc of the mobile device, and the coded disc is also called an encoder, which is a sensor for converting rotation motion into an electric signal and can be used for detecting the wheel rotating velocity, the rotation angle of a mechanical joint, etc.

The first vector F is used for describing the change of the relative velocity between the mobile device and the followed target object caused by the own movement of the first coordinate system which is fixedly connected with the mobile device, the computational formula of the first vector F is $F=-(\omega_f*\rho+v_f)$, wherein $\omega_f$ represents the absolute rotating velocity vector of the mobile device (relative to the ground), $v_f$ represents the absolute translation velocity vector of the mobile device (relative to the ground), and $\rho$ represents the first radius vector scalar. For the specific vector addition and subtraction algorithm, please refer to FIG. 2.

Step 102, a second vector is acquired, wherein the second vector is a relative velocity vector between the mobile device and the followed target object.

Step 102 can be specifically implemented as follows:

acquiring the first relative position information of the target object relative to the mobile device, wherein the first relative position information is represented as the included angle $\alpha$ and the first radius vector scalar $\rho$ by the polar coordinates, the first radius vector scalar $\rho$ represents the radius vector scalar from the mobile device to the target object, and the included angle $\alpha$ represents the included angle between the first radius vector scalar ρ and the absolute translation velocity vector $v_f$ of the mobile device; and carrying out a differential operation according to the first relative position information to acquire the second vector, wherein the second vector is represented as follows in a coordinate manner:

$$R = \left( \frac{d[\rho(t)\cos\alpha(t)]}{dt}, \frac{d[\rho(t)\sin\alpha(t)]}{dt} \right)$$

wherein, R represents the second vector, and ρ represents the first radius vector scalar. The differential operation can be implemented by a differentiator, and the differentiator refers to a signal processing link of a derivate which can extract a sequence from a time sequence.

Step 103, the first vector and the second vector are added to acquire a third vector, wherein the third vector is an absolute velocity vector of the target object; and a first included angle is acquired according to the third vector, wherein the first included angle is an included angle between the own absolute velocity vector of the mobile device and the third vector.

The third vector T is used for representing the absolute velocity vector of the target object, wherein the relationship of the vectors T, R and F is as follows: T=F+R, the vector F can be acquired by implementing step 101, the vector R can be acquired by implementing step 102, and for the addition and subtraction relationship of T, R and F, please refer to what is shown in FIG. 2.

Since the first coordinate system is fixedly connected with the mobile device, the included angle, referred to as the first included angle, between the own absolute velocity vector of the mobile device and the vector T can be acquired according to the vector T; and the own absolute velocity vector of the mobile device can be measured by the coded disc of the mobile device.

Step 104, a control law for controlling the movement of the mobile device is generated according to the first included angle.

Step 104 can be specifically implemented as follows:

decomposing a target relative position into a first relative position and a second relative position according to the first included angle, generating a corresponding first control law according to the first relative position, and generating a corresponding second control law according to the second relative position and the first included angle, wherein the target relative position is a following position where the mobile device is about to arrive at and which is acquired by the mobile device according to the movement of the target object;

wherein, the first control law is used for controlling a translation velocity of the mobile device, and the first control law drives the first relative position to gradually converge; and the second control law is used for controlling the rotating velocity of the mobile device, and the second control law drives the second relative position and the first included angle to gradually converge.

The decomposing a target relative position into a first relative position and a second relative position according to the first included angle includes:

in a second coordinate system constructed with the followed target object as a coordinate origin, setting a positive X axis direction of the second coordinate system to be overlapped with the motion direction of the target object; in the second coordinate system, the coordinates of the target relative position are $x_0$, $y_0$; and the first relative position and the second relative position are represented as follows:

$$\Delta x = x_0 - \rho\cos(\alpha - \theta_\gamma)$$

$$\Delta y = y_0 - \rho\sin(\alpha - \theta_\gamma)$$

wherein, the first relative position information of the target object relative to the mobile device is represented as a second included angle α and the first radius vector scalar ρ by the polar coordinates, $\Delta x$ represents the first relative position, $\Delta y$ represents the second relative position, and $\theta_\gamma$ represents the first included angle.

The generating a corresponding second control law according to the second relative position includes:

acquiring a first approach angle $\theta_\alpha = \Delta y * k$ according to the second relative position, wherein $\theta_\alpha$ represents the first approach angle, and k represents a proportionality coefficient; and acquiring the second control law according to the first approach angle $\downarrow_\alpha$ and the first included angle $\theta_\gamma$.

The implementation of step 104 is introduced below in detail in combination with FIG. 3.

Figure 3:
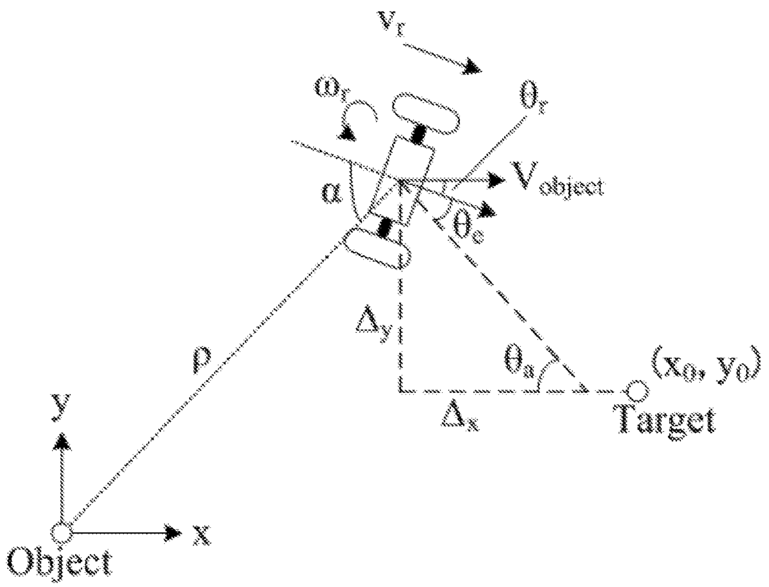
FIG. 3 is a schematic diagram of a control relationship in one embodiment of the present invention.
Figure 4:
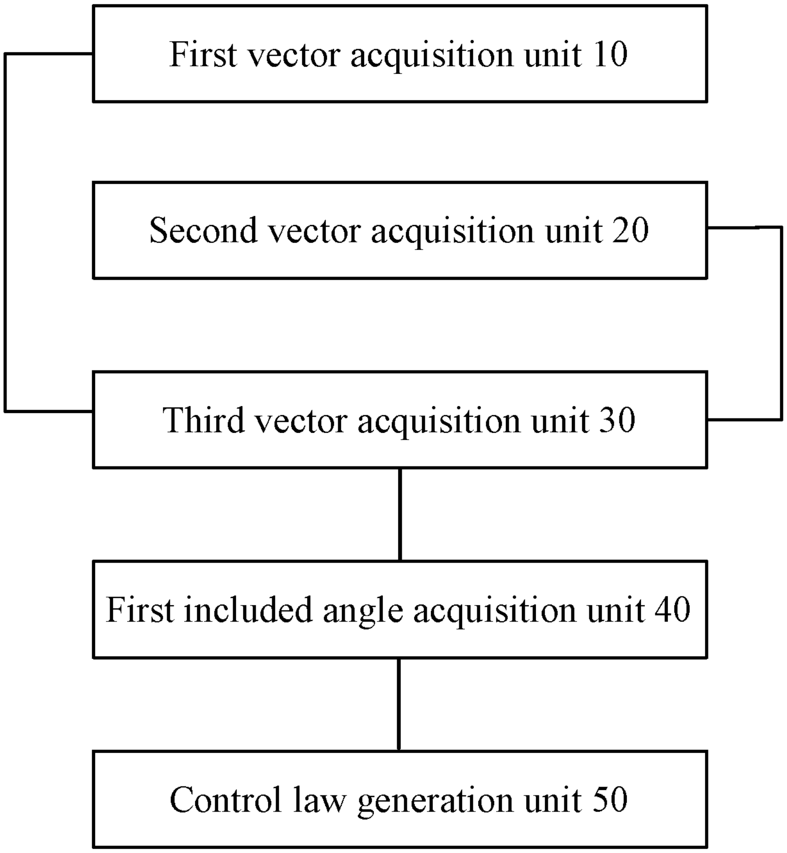
FIG. 4 is a schematic diagram of structural composition of a mobile device in the second embodiment of the present invention.

As shown in FIG. 3, the second coordinate system is constructed by the followed target object (Object), and the positive X axis direction of the second coordinate system is overlapped with the motion direction $V_{object}$ of the target object. In the second coordinate system, the coordinates of the target relative position (Target) of the mobile device relative to the followed target object are marked as ($x_0$, $y_0$), wherein the target relative position refers to the following position where the mobile device is about to arrive at and which is acquired by the mobile device according to the movement of the target object, for example, the target object moves from a point A to a point B, the mobile device acquires that its followed target object moves from a point A1 to a point B1, and then the coordinates of the point B1 are ($x_0$, $y_0$).

In FIG. 3, $\theta_r$ represents the first included angle, which is the included angle between the own absolute velocity vector $v_r$ of the mobile device and the absolute velocity vector $V_{object}$ of the target object, and can be acquired by implementing the foregoing steps 101-103; the target relative position ($x_0$, $y_0$) is decomposed into the first relative position and the second relative position according to the first included angle $\theta_r$, that is, an error ($\Delta x$, $\Delta y$) between the mobile device and the target relative position is calculated, wherein, $$\Delta x = x_0 - \rho\cos(\alpha - \theta_\gamma)$$

$$\Delta y = y_0 - \rho\sin(\alpha - \theta_\gamma)$$

wherein, $\Delta x$ represents the error of the mobile device and the target relative position in the X axis direction, $\Delta y$ represents the error of the mobile device and the target relative position in the Y axis direction, and α represents the second included angle when the first relative position information of the target object relative to the mobile device is represented by the polar coordinates.

The purpose of the embodiment of the present invention is to generate the control law for controlling the $\Delta x$ and the $\Delta y$ to gradually converge, and the $\Delta x$ and the $\Delta y$ gradually converge to zero by the implementation of the control law, so that the mobile device gradually moves to ($x_0$, $y_0$). The control law for controlling the $\Delta x$ and the $\Delta y$ to gradually converge can be respectively designed as follows:

a control law with a specified mobile device forward velocity $v_r$ is designed for the Δx:

$v_\gamma = f_x(\Delta x, t)$, wherein the control law drives the Δx to gradually converge to zero, and t represents time. In a specific implementation process, the control law can be a proportion-integral-differential (PID) control law and can also be other control laws, and this is not limited in the embodiment of the present invention.

A cascade controller with closed loop control of an inner loop and an outer loop is designed for the Δy:

the outer loop: an approach angle $\theta_\alpha = \Delta y * k$ in direct proportion to distance is designed, wherein k represents the proportionality coefficient, and $\theta_\alpha$ represents the approach angle; the size of the k determines the angle of the mobile device to approach a walking route of the target object, the larger the k is, the mobile device will approach the walking route of the target object in a larger angle, and the direction of the mobile device is corrected to be the same as the direction of the target at a place closer to the walking route of the target object; generally speaking, the larger the k is, the closer the mobile device can follow the target, but if the k is too large, the direction control loop of the mobile device will enter an oscillation state, so the value needs to be determined according to experience and actual debugging; and the inner loop: the control law of the rotating speed of the mobile device is set as follows: $\omega_\gamma = f_y(\theta_\alpha - \theta_\gamma, t)$, wherein $\theta_\alpha - \theta_\gamma$ is the $\theta_e$ in FIG. 3, the $\theta_e$ represents an error angle between the forward direction of the mobile device and the approach angle, and as long as the mobile device is still forwarding, the control law will continuously drive the Δy and $\theta_\gamma$ to simultaneously converge to zero; and the control law can be the PID control law and can also be other control laws, and this is not limited in the embodiment of the present invention.

It should be noted that, the closed loop control (Closed Loop Control) in the embodiment of the present invention means as follows: for a dynamic system, an error between a specified output target and an actual output is compared to adjust the input of the system according to a certain rule, so that the actual output of the system converges toward the specified target, and the purposes of accelerating the response speed of the system and resisting inner and outer disturbance are achieved.

Embodiment 2

Corresponding to the information processing method in the first embodiment of the present invention, the second embodiment of the present invention further provides a mobile device. As shown in FIG. 2, the device includes:

a first vector acquisition unit 10, configured to acquire a first vector, wherein the first vector is used for describing the change of a relative velocity between the mobile device and a followed target object caused by the own movement of a first coordinate system which is fixedly connected with the mobile device;

a second vector acquisition unit 20, configured to acquire a second vector, wherein the second vector is a relative velocity vector between the mobile device and the followed target object;

a third vector acquisition unit 30, connected with the first vector acquisition unit 10 and the second vector acquisition unit 20, and configured to add the first vector and the second vector to acquire a third vector, wherein the third vector is an absolute velocity vector of the target object;

a first included angle acquisition unit 40, connected with the third vector acquisition unit 30, and configured to acquire a first included angle according to the third vector, wherein the first included angle is an included angle between the own absolute velocity vector of the mobile device and the third vector; and a control law generation unit 50, connected with the first included angle acquisition unit 40, and configured to generate a control law for controlling the movement of the mobile device according to the first included angle.

In one embodiment, the control law generation unit 50 is further configured to decompose a target relative position into a first relative position and a second relative position according to the first included angle, generate a corresponding first control law according to the first relative position, and generate a corresponding second control law according to the second relative position and the first included angle, wherein the target relative position is a following position where the mobile device is about to arrive at and which is acquired by the mobile device according to the movement of the target object;

wherein, the first control law is used for controlling the translation velocity of the mobile device, and the first control law drives the first relative position to gradually converge; and the second control law is used for controlling the rotating velocity of the mobile device, and the second control law drives the second relative position and the first included angle to gradually converge.

In one embodiment, the control law generation unit 50 is further configured to: in a second coordinate system constructed with the followed target object as a coordinate origin, set a positive X axis direction of the second coordinate system to be overlapped with the motion direction of the target object; in the second coordinate system, the coordinates of the target relative position are $x_0$, $y_0$; and the first relative position and the second relative position are represented as follows:

$$\Delta \chi = \chi_0 - \rho\cos(\alpha - \theta_\gamma)$$

$$\Delta y = y_0 - \rho\sin(\alpha - \theta_\gamma)$$

wherein, first relative position information of the target object relative to the mobile device is represented as a first included angle α and a first radius vector scalar ρ by polar coordinates, Δx represents the first relative position, Δy represents the second relative position, and $\theta_\gamma$ represents the first included angle.

In one embodiment, the control law generation unit 50 is further configured to: acquire a first approach angle $\theta_\alpha = \Delta y * k$ according to the second relative position, wherein $\theta_\alpha$ represents the first approach angle, and k represents a proportionality coefficient; and acquire the second control law according to the first approach angle $\theta_\alpha$ and the first included angle $\theta_\gamma$.

In one embodiment, the first vector acquisition unit 10 is further configured to:

acquire the first relative position information of the target object relative to the mobile device, wherein the first relative position information is represented as the first included angle α and the first radius vector ρ by the polar coordinates, the first radius vector scalar ρ represents the radius vector scalar from the mobile device to the target object, and the second included angle α represents the included angle between the first radius vector scalar ρ and an absolute translation velocity vector $v_f$ of the mobile device; and acquire the first vector through the following relationship: $F = -(\omega_f * \rho + v_f)$, wherein F represents the first vector, $\omega_f$ represents an absolute rotating velocity vector of the mobile device, and $v_f$ represents the absolute translation velocity vector of the mobile device.

In one embodiment, the second vector acquisition unit 20 is further configured to: acquire the first relative position information of the target object relative to the mobile device, wherein the first relative position information is represented as the first included angle α and the first radius vector scalar ρ by the polar coordinates, the first radius vector scalar ρ represents the radius vector scalar from the mobile device to the target object, and the first included angle α represents the included angle between the first radius vector scalar ρ and the absolute translation velocity vector $v_f$ of the mobile device; and carry out a differential operation according to the first relative position information to acquire the second vector, wherein the second vector is represented as follows in a coordinate manner:

$$R = \left(\frac{d[\rho(t)\cos\alpha(t)]}{dt}, \frac{d[\rho(t)\sin\alpha(t)]}{dt}\right)$$

wherein, R represents the second vector, and ρ represents the first radius vector scalar.

It should be noted that, the first vector acquisition unit 10, the second vector acquisition unit 20, the third vector acquisition unit 30, the first included angle acquisition unit 40 and the control law generation unit 50 can be achieved by a processor, a microprocessor (MCU), an application-specific integrated circuit (ASIC) or a field programmable gate array (FPGA) of the mobile device.

By implementing the first embodiment and the second embodiment of the present invention, the mobile device can follow any specified position of the target object (i.e., achieve omnidirectional following), and the mobile device can not only follow behind the target object, but also can follow in front of the target object. Moreover, in the embodiments of the present invention, the absolute position between the mobile device and the target object does not need to be acquired in the target following, and only the relative position between the mobile device and the target object needs to be acquired. Therefore, in the target following in the embodiments of the present invention, only a relative position sensor mounted on the mobile device is used for acquiring the position of the followed object relative to the autonomous mobile device, for example, the relative position sensor is an ultra wideband (UWB, Ultra Wideband) positioning sensor, an ultrasonic distance measurement sensor, an infrared distance measurement sensor, a sonar sensor, a radar, a machine vision sensor, and so on; and no absolute position sensor (e.g., GPS) needs to participate, therefore the inconvenience of outdoor satellite search positioning of a global position system (GPS, Global Position System) is avoided.

It should be noted that, the mobile device in the embodiment of the present invention can be a self-balancing car, an electric multi-wheel vehicle, an unmanned aerial vehicle, and the like. In principle, any device that can achieve autonomous movement should be applicable to the embodiments of the present invention. The method and the device in the embodiments of the present invention will be described in further detail with reference to a self-balancing car as an example.

Embodiment 3

In order to achieve the target following method in the embodiment of the present invention, the following mathematical model needs to be constructed:

The self-balancing car having a differential wheel can make forward and steering movement, but cannot make transverse movement; referring to FIG. 2, in a first coordinate system fixedly connected with the self-balancing car (i.e., a coordinate system with a horizontal axis $x_f$ and a vertical axis $y_f$ in FIG. 2), the motion relationship of the self-balancing car and the followed target object is as follows:

a relative position sensor is arranged on the self-balancing car, first relative position information of the followed target object relative to the self-balancing car measured at a certain moment is represented as an included angle α and a first radius vector scalar ρ by polar coordinates; wherein the first radius vector scalar ρ represents the radius vector scalar from the self-balancing car to the target object, and the included angle α represents the included angle between the first radius vector scalar ρ and an absolute translation velocity vector $v_f$ of the self-balancing car. In addition, the translation velocity vector of the mobile device relative to the ground is $v_f$, and the rotating velocity vector relative to the ground is $\omega_f$, the $v_f$ and the $\omega_f$ can be measured by a coded disc of the mobile device.

A first vector F is used for describing the change of a relative velocity between the mobile device and the followed target object caused by the own movement of a first coordinate system which is fixedly connected with the mobile device, the computational formula of the first vector F is $F=-(\omega_f*\rho+v_f)$, wherein $\omega_f$ represents the absolute rotating velocity vector of the mobile device (relative to the ground), $v_f$ represents the absolute translation velocity vector of the mobile device (relative to the ground), ρ represents the first radius vector scalar. For a specific vector addition and subtraction algorithm, please refer to FIG. 2.

A second vector R is used for representing a relative velocity vector between the self-balancing car and the followed target object, and can be directly acquired by carrying out differential on the first relative position information by using a differentiator, and is represented as follows in a coordinate manner:

$$R = \left(\frac{d[\rho(t)\cos\alpha(t)]}{dt}, \frac{d[\rho(t)\sin\alpha(t)]}{dt}\right)$$

wherein, R represents the second vector, and ρ represents the first radius vector scalar.

A third vector T is used for representing the absolute velocity vector of the target object, wherein the relationship of the vectors T, R and F is as follows: T=F+R, the vectors R and F are known or can be indirectly acquired by the known vectors.

Since the first coordinate system is fixedly connected with the self-balancing car, the included angle, referred to as the first included angle, between the own absolute velocity vector of the self-balancing car and the vector can be acquired according to the vector; wherein the own absolute velocity vector of the self-balancing car can be measured by a coded disc of the self-balancing car.

In addition, in order to achieve the target following method in the embodiment of the present invention, the controller of the self-balancing car is designed as follows:

referring to FIG. 3, a second coordinate system is constructed by the followed object (Object), and the positive X axis direction of the second coordinate system is overlapped with the motion direction ($V_{object}$) of the target object. In the coordinate system, the coordinates of the self-balancing car relative to the target relative position Target of the followed target object are ($x_0$, $y_0$). The error between the self-balancing car and the target relative position is ($x_0$, $y_0$) is ($\Delta x$, $\Delta y$). Based on the mathematical model constructed above, the included angle $\theta_\gamma$ between the target object and the absolute velocity vector of the self-balancing car can be figured out, wherein:

$$\Delta x = x_0 - \rho\cos(\alpha - \theta_\gamma)$$

$$\Delta y = y_0 - \rho\sin(\alpha - \theta_\gamma)$$

wherein, $\Delta x$ represents the error of the self-balancing car and the target relative position in the X axis direction, $\Delta y$ represents the error of the self-balancing car and the target relative position in the Y axis direction, and $\alpha$ represents the second included angle when the first relative position information of the target object relative to the self-balancing car is represented by the polar coordinates.

The purpose of the embodiment of the present invention is to generate a control law for controlling the $\Delta x$ and the $\Delta y$ to gradually converge, and the $\Delta x$ and the $\Delta y$ gradually converge to zero by the implementation of the control law, so that the self-balancing car gradually moves to ($x_0$, $y_0$). The control law for controlling the $\Delta x$ and the $\Delta y$ to gradually converge can be respectively designed as follows:

a control law with a specified mobile device forward velocity $v_r$ is designed for the $\Delta x$: $v_\gamma = f_x(\Delta x, t)$, the control law drives the $\Delta x$ to gradually converge to zero, and t represents time. In a specific implementation process, the control law can be a PID control law and can also be other control laws, and this is not limited in the embodiment of the present invention.

A cascade controller with closed loop control of an inner loop and an outer loop is designed for the $\Delta y$:

the outer loop: an approach angle $\theta_\alpha = \Delta y * k$ in direct proportion to distance is designed, wherein k represents a proportionality coefficient, and $\theta_\alpha$ represents the approach angle; the size of the k determines the angle of the mobile device to approach a walking route of the target object, the larger the k is, the mobile device will approach the walking route of the target object in a larger angle, and the direction of the mobile device is corrected to be the same as the direction of the target at a place closer to the walking route of the target object; generally speaking, the larger the k is, the closer the mobile device can follow the target, but if the k is too large, the direction control loop of the mobile device will enter an oscillation state, so the value needs to be determined according to experience and actual debugging; and the inner loop: the control law of the rotating speed of the mobile device is set as follows: $\omega_\gamma = f_y(\theta_\alpha - \theta_\gamma, t)$, wherein $\theta_\alpha - \theta_\gamma$ is the $\theta_e$ in FIG. 3, and as long as the mobile device is still forwarding, the control law will continuously drive the $\Delta y$, the $\theta_\alpha$ and the $\theta_e$ to simultaneously converge to zero; and the control law can be the PID control law and can also be other control laws, and this is not limited in the embodiment of the present invention.

The relative position sensor in the third embodiment of the present invention can be a UWB positioning sensor, an ultrasonic distance measurement sensor, an infrared distance measurement sensor, a sonar sensor, a radar, a machine vision sensor, and so on.

In the third embodiment of the present invention, the mathematical model for data measurement of the relative position sensor is established at first, the mathematical model includes the relative position, the own movement of the self-balancing car (i.e., the measured data of the coded disc of the wheel) and the motion velocity of the followed target object. Secondly, differential is carried out on the relative position measured by the sensor by a differentiator to acquire a relative velocity. Thereafter, a coordinate conversion method is adopted to eliminate the influence of the own movement (acquired by the coded disc of the wheel) of the device on the measurement of velocity, and the included angle between the absolute velocity directions of the self-balancing car and the followed object is figured out. Finally, aiming at the problem of an instable drift angle of the traditional following method, the relative position is decomposed into a transverse relative position and a longitudinal relative position, the cascade closed loop controller is designed for the transverse relative position, so that the longitudinal relative position error and the velocity direction error converge to zero, therefore the stability of the system is guaranteed.

As the control degree of freedom of "absolute velocity direction" is added, the coupling between control loops can be eliminated, and thus the system acquires global stability.

It should be noted that, the embodiment of the present invention is not only applicable to the aforementioned self-balancing car, but also applicable to electric multi-wheel vehicles, unmanned aerial vehicles and other autonomous mobile devices. By implementing the embodiment of the present invention, the mobile device can follow any specified position of the target object, and can not only follow behind the target object, but also can follow in front of the target object. Moreover, according to the target following method in the embodiment of the present invention, the absolute position between the mobile device and the target object does not need to be acquired, and only the relative position between the mobile device and the target object needs to be acquired. Therefore, according to the target following method in the embodiment of the present invention, only a relative position sensor mounted on the mobile device is used for acquiring the position of the followed object relative to the autonomous mobile device; and no absolute position sensor (e.g., GPS) needs to participate, therefore the inconvenience of outdoor satellite search positioning of the GPS or the like is avoided.

In the several embodiments provided in the present invention, it should be understood that, the disclosed method, device and electronic device can be implemented in other manners. For example, the device embodiments described above are merely exemplary, e.g., the division of the units is only a logic function division, other division manners can exist in practical implementation, for example, a plurality of units or components can be combined or integrated to another system, or some features can be omitted or not implemented. In addition, the displayed or discussed mutual coupling or direct coupling or communication connection between the components can be indirect coupling or communication connection of devices or units through some interfaces, and can be in electrical, mechanical or other forms.

The units described as separate components can be separated physically or not, the components displayed as units can be physical units or not, namely, can be located in one place, or can be distributed on a plurality of network units.

A part of or all the units can be selected to implement the purposes of the solutions in the embodiments according to actual demands.

In addition, the functional units in the embodiments of the present invention can be integrated in a processing unit, or the units are singly used as a unit, or two or more units are integrated in one unit; and the integrated unit can be implemented in the form of hardware and can also be implemented in a form of hardware and software functional units.

Those of ordinary skill in the art can understand that all or a part of the steps in the above method embodiments can be implemented by a hardware corresponding to program instructing, the foregoing program can be stored in a computer readable storage medium, and when being executed, the program executes the steps including the above method embodiments; and the foregoing storage medium includes various media capable of storing program codes, such as a mobile storage device, a read-only memory (ROM, Read-Only Memory) a random access memory (RAM, Random Access Memory), a magnetic disk or an optical disk, etc.

Or, if aforementioned integrated unit in the embodiments of the present invention is implemented in the form of a software functional module and is sold or used as an independent product, it can also be stored in a computer readable storage medium. Based on this understanding, the technical solutions substantially, or the parts contributing to the prior art in the embodiments of the present invention can be implemented in the form of a software product, the computer software product is stored in a storage medium, and includes a plurality of instructions enabling a computer device (can be a personnel computer, a server, or a network device or the like) to execute all or a part of the methods in the embodiments of the present invention. The foregoing storage medium includes a variety of media capable of storing program codes, such as a mobile storage device, a read-only memory (ROM, Read-Only Memory), a random access memory (RAM, Random Access Memory), a magnetic disk or an optical disk, etc.

In view of this, the embodiments of the present invention further provide a computer readable storage medium, wherein the storage medium includes a group of computer executable instructions, and the instructions are used for executing the information processing method in the embodiments of the present invention.

The foregoing descriptions are merely specific embodiments of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. An information processing method, applied to a mobile device, comprising:

acquiring a first vector, wherein the first vector is used for describing the change of a relative velocity between the mobile device and a followed target object caused by the own movement of a first coordinate system which is fixedly connected with the mobile device;

acquiring a second vector, wherein the second vector is a relative velocity vector between the mobile device and the followed target object;

adding the first vector to the second vector to acquire a third vector, wherein the third vector is an absolute velocity vector of the target object; and acquiring a first included angle according to the third vector, wherein the first included angle is an included angle between the own absolute velocity vector of the mobile device and the third vector; and generating a control law for controlling the movement of the mobile device according to the first included angle.

2. The information processing method of claim 1, wherein the generating a control law for controlling the movement of the mobile device according to the first included angle comprises:

decomposing a target relative position into a first relative position and a second relative position according to the first included angle, generating a corresponding first control law according to the first relative position, and generating a corresponding second control law according to the second relative position and the first included angle, wherein the target relative position is a following position where the mobile device is about to arrive at and which is acquired by the mobile device according to the movement of the target object;

wherein, the first control law is used for controlling the translation velocity of the mobile device, and the first control law drives the first relative position to gradually converge; and the second control law is used for controlling the rotating velocity of the mobile device, and the second control law drives the second relative position and the first included angle to gradually converge.

3. The information processing method of claim 2, wherein the decomposing a target relative position into a first relative position and a second relative position according to the first included angle comprises:

in a second coordinate system constructed with the followed target object as a coordinate origin, setting a positive X axis direction of the second coordinate system to be overlapped with the motion direction of the target object; in the second coordinate system, the coordinates of the target relative position are $x_0$, $y_0$; and the first relative position and the second relative position are represented as follows:

$$\Delta\chi=\chi_0-\rho\cos(\alpha-\theta_\gamma)$$

$$\Delta y=y_0-\rho\sin(\alpha-\theta_\gamma)$$

wherein, first relative position information of the target object relative to the mobile device is represented as a second included angle $\alpha$ and a first radius vector scalar $\rho$ by polar coordinates, $\Delta x$ represents the first relative position, $\Delta y$ represents the second relative position, and $\theta_\gamma$ represents the first included angle.

4. The information processing method of claim 3, wherein the generating a corresponding second control law according to the second relative position comprises:

acquiring a first approach angle $\theta_\alpha=\Delta y*k$ according to the second relative position, wherein $\theta_\alpha$ represents the first approach angle, and k represents a proportionality coefficient; and acquiring the second control law according to the first approach angle $\theta_\alpha$ and the first included angle $\theta_\gamma$.

5. The information processing method of claim 1, wherein the acquiring a first vector comprises:

acquiring the first relative position information of the target object relative to the mobile device, wherein the first relative position information is represented as the second included angle $\alpha$ and the first radius vector $\rho$ by the polar coordinates, the first radius vector scalar $\rho$ represents the radius vector scalar from the mobile device to the target object, and the second included angle $\alpha$ represents the included angle between the first radius vector scalar $\rho$ and an absolute translation velocity vector $v_f$ of the mobile device; and acquiring the first vector through the following relationship: $F=-(\omega_f*\rho+v_f)$, wherein F represents the first vector, $\omega_f$ represents an absolute rotating velocity vector of the mobile device, and $v_f$ represents the absolute translation velocity vector of the mobile device.

6. The information processing method of claim 1, wherein the acquiring a second vector comprises:

acquiring the first relative position information of the target object relative to the mobile device, wherein the first relative position information is represented as the second included angle $\alpha$ and the first radius vector scalar $\rho$ by the polar coordinates, the first radius vector scalar $\rho$ represents the radius vector scalar from the mobile device to the target object, and the second included angle $\alpha$ represents the included angle between the first radius vector scalar $\rho$ and the absolute translation velocity vector $v_f$ of the mobile device; and carrying out a differential operation according to the first relative position information to acquire the second vector, wherein the second vector is represented as follows in a coordinate manner:

$$R=\left(\frac{d[\rho(t)\cos\alpha(t)]}{dt},\ \frac{d[\rho(t)\sin\alpha(t)]}{dt}\right)$$

wherein, R represents the second vector, and $\rho$ represents the first radius vector scalar.

7. A mobile device, comprising:

a first vector acquisition unit, configured to acquire a first vector, wherein the first vector is used for describing the change of a relative velocity between the mobile device and a followed target object caused by the own movement of a first coordinate system which is fixedly connected with the mobile device;

a second vector acquisition unit, configured to acquire a second vector, wherein the second vector is a relative velocity vector between the mobile device and the followed target object;

a third vector acquisition unit, configured to add the first vector to the second vector to acquire a third vector, wherein the third vector is an absolute velocity vector of the target object;

a first included angle acquisition unit, configured to acquire a first included angle according to the third vector, wherein the first included angle is an included angle between the own absolute velocity vector of the mobile device and the third vector; and a control law generation unit, configured to generate a control law for controlling the movement of the mobile device according to the first included angle.

8. The mobile device of claim 7, wherein the control law generation unit is further configured to decompose a target relative position into a first relative position and a second relative position according to the first included angle, generate a corresponding first control law according to the first relative position, and generate a corresponding second control law according to the second relative position and the first included angle, wherein the target relative position is a following position where the mobile device is about to arrive at and which is acquired by the mobile device according to the movement of the target object;

wherein, the first control law is used for controlling the translation velocity of the mobile device, and the first control law drives the first relative position to gradually converge; and the second control law is used for controlling the rotating velocity of the mobile device, and the second control law drives the second relative position and the first included angle to gradually converge.

9. The mobile device of claim 8, wherein the control law generation unit is further configured to: in a second coordinate system constructed with the followed target object as a coordinate origin, set a positive X axis direction of the second coordinate system to be overlapped with the motion direction of the target object; in the second coordinate system, the coordinates of the target relative position are $x_0$, $y_0$; and the first relative position and the second relative position are represented as follows:

$$\Delta\chi=\chi_0-\rho\cos(\alpha-\theta_\gamma)$$

$$\Delta y=y_0-\rho\sin(\alpha-\theta_\gamma)$$

wherein, first relative position information of the target object relative to the mobile device is represented as a second included angle $\alpha$ and a first radius vector scalar $\rho$ by polar coordinates, $\Delta x$ represents the first relative position, $\Delta y$ represents the second relative position, and $\theta_\gamma$ represents the first included angle.

10. The mobile device of claim 9, wherein the control law generation unit is further configured to: acquire a first approach angle $\theta_\alpha=\Delta y*k$ according to the second relative position, wherein $\theta_\alpha$ represents the first approach angle, and k represents a proportionality coefficient; and acquire the second control law according to the first approach angle $\theta_\alpha$ and the first included angle $\theta_\gamma$.

11. The mobile device of claim 7, wherein the first vector acquisition unit is further configured to:

acquire the first relative position information of the target object relative to the mobile device, wherein the first relative position information is represented as the second included angle $\alpha$ and the first radius vector $\rho$ by the polar coordinates, the first radius vector scalar $\rho$ represents the radius vector scalar from the mobile device to the target object, and the second included angle $\alpha$ represents the included angle between the first radius vector scalar $\rho$ and an absolute translation velocity vector $v_f$ of the mobile device; and acquire the first vector through the following relationship: $F=-(\omega_f*\rho+v_f)$, wherein F represents the first vector, ωf represents an absolute rotating velocity vector of the mobile device, and $v_f$ represents the absolute translation velocity vector of the mobile device.

12. The mobile device of claim 7, wherein the second vector acquisition unit is further configured to:

acquire the first relative position information of the target object relative to the mobile device, wherein the first relative position information is represented as the second included angle $\alpha$ and the first radius vector scalar $\rho$ by the polar coordinates, the first radius vector scalar $\rho$ represents the radius vector scalar from the mobile device to the target object, and the second included angle $\alpha$ represents the included angle between the first radius vector scalar $\rho$ and the absolute translation velocity vector $v_f$ of the mobile device; and carry out a differential operation according to the first relative position information to acquire the second vector, wherein the second vector is represented as follows in a coordinate manner:

$$R = \left(\frac{d[\rho(t)\cos\alpha(t)]}{dt}, \frac{d[\rho(t)\sin\alpha(t)]}{dt}\right)$$

wherein, R represents the second vector, and ρ represents the first radius vector scalar.

13. A computer storage medium of a mobile device, wherein a computer executable instruction is stored in the computer storage medium, and the computer executable instruction is configured to:

acquire a first vector, wherein the first vector is used for describing the change of a relative velocity between the mobile device and a followed target object caused by the own movement of a first coordinate system which is fixedly connected with the mobile device;

acquire a second vector, wherein the second vector is a relative velocity vector between the mobile device and the followed target object;

add the first vector to the second vector to acquire a third vector, wherein the third vector is an absolute velocity vector of the target object; and acquiring a first included angle according to the third vector, wherein the first included angle is an included angle between the own absolute velocity vector of the mobile device and the third vector; and generate a control law for controlling the movement of the mobile device according to the first included angle.

* * * * *